United States Patent [19]

Theysohn

[11] 4,075,266
[45] Feb. 21, 1978

[54] METHOD FOR COATING FOIL MATERIAL

[76] Inventor: Friedrich Theysohn, An den Hilligenwohren 9, D-3000 Hannover, Germany

[21] Appl. No.: 737,571

[22] Filed: Nov. 1, 1976

[51] Int. Cl.² .............. B29C 17/04; B29D 9/00; B29F 1/00
[52] U.S. Cl. ................................ 264/92; 264/250; 264/255; 264/259; 264/322; 264/329; 264/328
[58] Field of Search ............. 264/46.4, 46.6, 46.8, 264/46.9, 92, 259, 328, 266, 97, 320, 255, 250, 329, 322, 46.7, 323, 3

[56] References Cited

U.S. PATENT DOCUMENTS

| | | | |
|---|---|---|---|
| 2,840,856 | 7/1958 | Moxness | 264/328 |
| 3,154,617 | 10/1964 | Schenk et al. | 264/266 |
| 3,159,698 | 12/1964 | Suh et al. | 264/266 |
| 3,247,550 | 4/1966 | Haines | 264/328 |
| 3,717,544 | 2/1973 | Valyi | 264/97 |
| 3,816,580 | 6/1974 | Valyi | 264/97 |
| 3,882,213 | 5/1975 | Uhlig | 264/97 |
| 3,929,953 | 12/1975 | Van Der Gaag et al. | 264/92 |
| 3,929,954 | 12/1975 | Valyi | 264/97 |
| 3,944,645 | 3/1976 | Farrell | 264/90 |
| 3,955,266 | 5/1976 | Honami et al. | 264/92 |

*Primary Examiner*—Willard E. Hoag
*Attorney, Agent, or Firm*—Spencer & Kaye

[57] ABSTRACT

Process for coating foil material of any desired shape with an injectable and pressable mass which stabilizes the foil material. An initially planar heated foil material is pressed by means of a depressor against a movable mold member of an injection mold having a movable mold member and a stationary mold member, with the injection mold having a shape which corresponds to the later shape of the foil material. The foil material is then pulled against the surface of the movable mold member by subatmospheric pressure. Subsequently, the movable mold member is moved toward the stationary mold member of the injection mold to provide a gap between the foil material and stationary mold member and the mass is slowly injected into the gap remaining between the foil material and the stationary mold member. The two mold members are further closed to finally distribute the mass over the foil material and press the mass to the required thickness. An apparatus is provided for practicing this method.

4 Claims, 3 Drawing Figures

METHOD FOR COATING FOIL MATERIAL

BACKGROUND OF THE INVENTION

The present invention relates to a method for coating foil material of any shape with an injectable and pressable mass which stabilizes the foil material.

Generally, plastic foil materials are used today for many applications, such as covers or paneling, respectively. In the automobile industry, in particular, such foil material is used to panel the dashboards, the wheel wells extending into the interior, or other surfaces. For aesthetic reasons, the visible surface of the foil material is provided with decorative patterns, while the covered or not visible side of the single or multilayer foil material carries a stabilizing mass, which may also serve as a sound damping agent. Since the foil material is generally very thin, there exist great difficulties in applying the stabilizing mass onto the foil material with economically justifiable expenditures without thereby destroying the foil material.

It is a primary object of the present invention to provide a process for coating foil material which assures that the coating mass is applied to the foil without destroying the foil and which is independent of the shape of the foil material.

A further object of the present invention is to provide such a process under economically feasible conditions.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention, as embodied and broadly described, provides a process for coating foil material of any desired shape with an injectable and pressable mass which stabilizes the foil material comprising: pressing an initially planar heated foil material by means of a depressor against a movable mold member of an injection mold having a movable mold member and a stationary mold member, the injection mold having a shape which corresponds to the later shape of the foil material; then pulling the foil material against the surface of the movable mold member by subatmospheric pressure; subsequently moving the movable mold member toward the stationary mold member to provide a gap between the foil material and stationary mold member of the injection mold and slowly injecting the mass into the gap remaining between the foil material and the stationary mold member; and further closing the two mold members to finally distribute the mass over the foil material and press the mass to the required thickness.

One advantage of this process is that the foil material is brought to the desired shape in one process step by the use of subatmospheric pressure and is simultaneously coated with the mass. Since the coating is not applied by spraying, but by a combined injection and pressing process, the mass which is introduced into the injection chamber at low speed cannot damage the foil material. During the subsequent final pressing step, the mass is also distributed over the foil material relatively slowly so that here too there is no danger of damage. Use of the depressor furthermore provides for a simple structure of the injection molding device used for application of the process since this depressor in cooperation with the foil material produces the seal required for producing the subatmospheric pressure.

It is to be understood that both the foregoing general description and the following detailed description are exemplary, but are not restrictive of the invention.

BRIEF DESCRIPTION OF THE DRAWINGS

The accompanying drawings, in which like numbers indicate like parts, illustrate an example of a presently preferred embodiment of the invention and, together with the description, serve to explain the principles of the invention.

Of the drawings.

DESCRIPTION OF A PREFERRED EMBODIMENT

Figure 1:
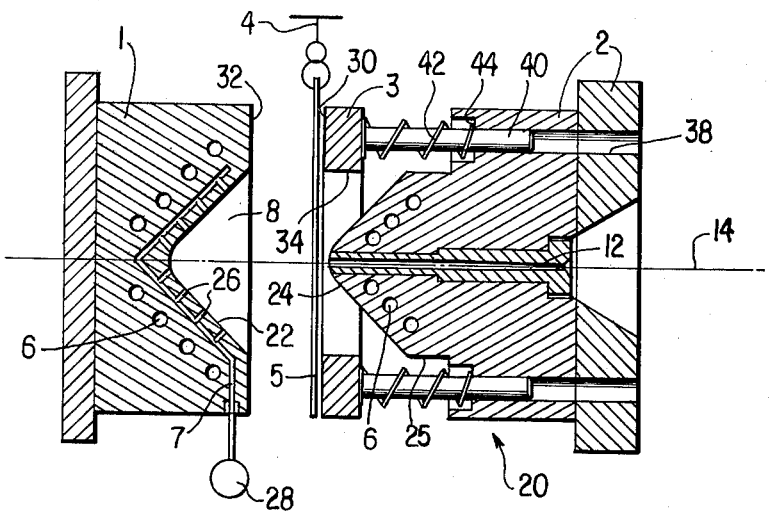
FIG. 1 is a top sectional view showing a schematic representation of an injection mold apparatus for practicing the process according to the present invention in rest position.
Figure 3:
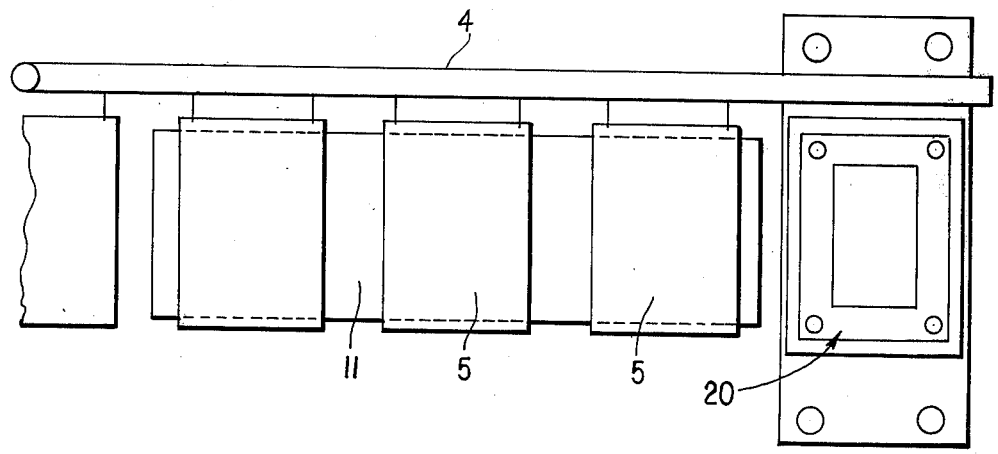
FIG. 3 is a side elevational view showing a total view of an apparatus for practicing the invention including feed intake means for supplying the foil material to the injection mold of FIG. 1.

Referring to the drawings and FIG. 1, there is shown an injection molding device, generally 20, having a movable mold member 1 and a stationary mold member 2. A depressor 3, which has, for example, an annular shape, is resiliently mounted in mold member 2 and is movable in a direction parallel to the mold axis 14. As shown in FIG. 3, a conveyor belt 4 is arranged above the injection molding device and a foil material 5 to be processed is fastened to this conveyor belt 4 so that it is suspended in the space between the two mold members 1 and 2. Foil material 5 can have any suitable structure and it may accordingly be made of a single layer or a plurality of layers. Foil material 5 is initially introduced into the injection molding machine 20 in a planar state. As shown in FIG. 1, both mold members 1 and 2 are provided with bores 6 into which a heat transfer medium required to cool or heat, respectively, the mold members is introduced.

Movable mold member 1 is designed so that its mold surface 22 corresponds to the shape of the coated foil material to be produced. In the illustrated case, the shape of mold surface 22 results in a concave shape for the mold cavity 8 of movable mold member 1. Movable mold member 1 contains a main channel 7 and a plurality of channels 26 which interconnect with main channel 7. The openings of channels 26 end at mold surface 22 of movable mold member 1 to enable subatmospheric pressure to be created in cavity 8. A device 28, such as a vacuum pump, for producing subatmospheric pressure is connected to main channel 7. Stationary mold member 2 has a mold surface 24 which is shaped to conform to mold surface 22 of mold member 1. A surface 25 generally parallel to mold axis 14 adjoins mold surface 24.

Depressor 3 has a planar end surface 30 which faces and cooperates with a planar end surface 32 of movable mold member 1 to press foil material 5 against end surface 32. Depressor 3 contains an inner side surface 34 which mates with and slides against surface 25 of stationary mold member 2. When depressor 3 is depressed to the position shown in FIG. 2, a portion of side surface 34 mates with surface 25 while the remaining portion of side surface 34 defines the ends of a gap 10 or injection chamber into which the coating mass is introduced.

Figure 2:
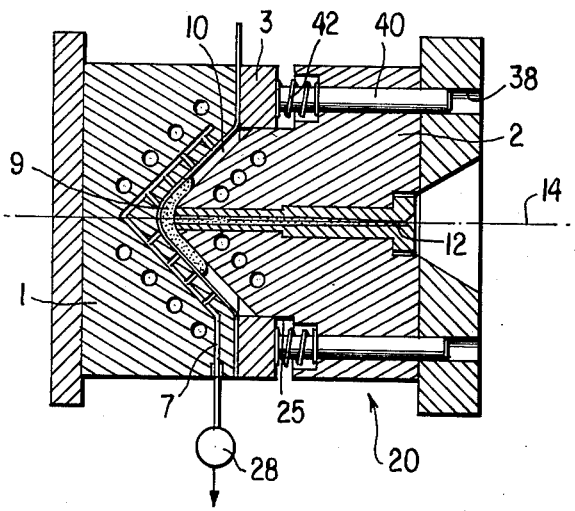
FIG. 2 is a top sectional view of the injection mold apparatus of FIG. 1 in the operating position.

In operation, after introduction of the heated foil material 5 into the injection molding device, mold member 1 is moved toward mold member 2 until the end surface 30 of depressor 3 presses the foil material 5 firmly against end surface 32 of mold member 1. Then subatmospheric pressure is produced by actuating pump 28 and foil material 5 is pulled into cavity 8 until foil material 5 contacts mold surface 22 and thereafter movable mold member 1 is moved toward stationary mold member 2 so that the position shown in FIG. 2 results where gap 10 is between foil material 5 and mold member 2 and, thereafter, a mass 9 intended for the coating is injected through a central bore 12 in mold member 2 into gap 10 between foil material 5 and mold member 2. Mass 9 is injected at slow speed and under low pressure so that there initially results a centrally located coating of greater wall thickness, as shown in FIG. 2.

When a sufficient quantity of mass 9 has been injected, bore 12 in mold member 2 is closed and mass 9 is pressed by further closing of mold members 1 and 2 until the desired wall thickness has been obtained so that it is slowly distributed over the entire surface of the foil material present at gap 10.

In order to permit foil material 5 to be pulled onto the surface of mold member 1, the foil material is preheated. As shown in FIG. 3, preheating of foil material 5 can be effected continuously by means of a heating device 11 which the foil material passes while traveling on conveyor belt 4 to the molding device. The temperature to which the foil material 5 is heated depends on the material, used for the foil. For example, a foil of polyvinylchloride is preheated to a temperature range from 200° to 250° C. Heating device 11 may be provided, for example, with infrared radiators.

Mold surface 22 of movable mold member 1 is advisably cooled right from the start by conducting a coolant through bores 6. Thus, foil material 5 is cooled immediately after coming in contact with the surface of mold member 1 and the process of firm adhesion between foil material 5 and mass 9 is thus accelerated. Stationary mold member 2 is charged through its bores 6 with a warmed or heated, respectively, medium in order to keep mass 9 flowable.

As shown in FIGS. 1 and 2, stationary mold member 2 contains axially extending bores 38 in which rods 40 are movably mounted. Rods 40 are attached to depressor 3 and springs 42 are positioned about rods 40 between depressor 3 and seats 44 in stationary mold member 2 so that depressor 3 is resiliently and movably mounted at stationary mold member 2.

Suitable materials for the foil material 5 are, for example, polypropylene, polyethylene, polyvinylchloride and polyester. The material used for the coating mass 9 is a thermoplastic resin, filled with heavy fillers in a high degree. This material must be able to stabilizise the foil material 5 and has the character of a damming insulation.

The distances for the gap 10 are depending on the thickness of the layer of coating mass 9 in the finished coated foil.

It will be understood that the above description of the present invention is susceptible to various modifications, changes and adaptations, and the same are intended to be comprehended within the meaning and range of equivalents of the appended claims.

What is claimed is:

1. In an injection molding method for coating foil material of any desired shape with an injectable and pressable mass which stabilizes the foil material, the steps comprising:
   a. pressing an initially planar heated foil material by means of a depressor against a movable mold member of an injection mold having a movable mold member and a stationary mold member, the injection mold having a shape which corresponds to the later shape of the foil material;
   b. then pulling the foil material against the surface of the movable mold member by subatmospheric pressure;
   c. subsequently moving the movable mold member toward the stationary mold member of the injection mold to provide a gap between the foil material and stationary mold member and slowly injecting the mass into the gap remaining between the foil material and the stationary mold member; and
   d. thereafter further moving the two mold members closer together to finally distribute the mass over the foil material and press the mass to the required thickness.

2. Method as defined in claim 1, wherein a heat transfer medium is passed through the injection mold.

3. Method as defined in claim 2, wherein a heat transfer medium is passed through the movable mold member to cool the movable mold member.

4. Method as defined in claim 2, wherein a heat transfer medium is passed through the stationary mold member to heat the stationary mold member.

* * * * *